United States Patent

Berrie et al.

3,640,674
Feb. 8, 1972

[54] PROCESS FOR COLORING SYNTHETIC TEXTILE MATERIALS WITH MONOAZO DYESTUFF DISPERSION

[72] Inventors: Alistair Howard Berrie; Nigel Hughes, both of Manchester, England

[73] Assignee: Imperial Chemical Industries Limited, London, England

[22] Filed: June 23, 1969

[21] Appl. No.: 835,776

[30] Foreign Application Priority Data

June 27, 1968  Great Britain ..................... 30,759/68

[52] U.S. Cl. ............................................ 8/41, 8/50, 8/21 C, 260/156
[51] Int. Cl. ....................................................... C09b 29/22
[58] Field of Search ............................. 8/41, 50, 21; 260/156

[56] References Cited

UNITED STATES PATENTS 3,487,066  12/1969  Ritter et al. ............................. 260/156

Primary Examiner—Donald Levy
Assistant Examiner—Patricia C. Ives
Attorney—Cushman, Darby & Cushman

[57] ABSTRACT

Process for coloring synthetic textile materials with an aqueous dispersion of a water-insoluble monoazo dyestuff, of the formula:

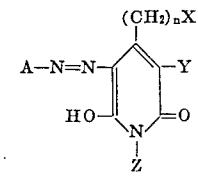

wherein A is an unsubstituted or substituted aryl radical; $n$ is 0 or 1; Z is an unsubstituted or substituted alkyl or aryl radical; X and Y are each independently hydrogen, unsubstituted or substituted alkyl or aryl or $-CN$, $-COOR$, $-COR$ and $-CONR^1R^2$ wherein R is unsubstituted or substituted alkyl or aryl and $R^1$ and $R^2$ each independently represent hydrogen or unsubstituted or substituted alkyl or aryl.

4 Claims, No Drawings

PROCESS FOR COLORING SYNTHETIC TEXTILE MATERIALS WITH MONOAZO DYESTUFF DISPERSION

This invention relates to a coloration process for synthetic textile materials, in particular aromatic polyester textile materials.

According to the invention there is provided a process for coloring synthetic textile materials which comprises treating said textile material with an aqueous dispersion of a water-insoluble monazo dyestuff which, in one of the possible tautomeric forms, is represented by the formula

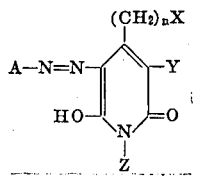

wherein A is an optionally substituted aryl radical, n is 0 or 1, Z is an optionally substituted alkyl or aryl radical, and X and Y each independently represent a hydrogen atom or an optionally substituted alkyl or aryl radical or a —CN, —COOR —COR or $CONR^1R^2$ radical, R is an optionally substituted alkyl or aryl radical, and $R^1$ and $R^2$ each independently represent a hydrogen atom or an optionally substituted alkyl or aryl radical or $R^1$ and $R^2$ together form with the nitrogen atom N a 5- or 6-membered nitrogen-containing heretocyclic ring, the dyestuffs being free from sulphonic acid and carboxylic acid groups.

The dyestuffs used in the process of the invention can exist in a number of possible tautomeric forms. For convenience the dyestuffs have only been formulated in one of the possible forms, but it is to be understood that the specification includes the use of the dyestuffs in any of the possible tautomeric forms.

As examples of the optionally substituted aryl radicals represented by A there may be mentioned optionally substituted naphthyl radicals, and especially optionally substituted phenyl radicals, in particular phenyl radicals which contain one or more of the same or different substituents such as chlorine, bromine, lower alkyl such as methyl, lower alkoxy such as methoxy, cyano, nitro, lower alkyl sulphonyl, lower alkyl carbonyl, carbo lower alkoxy, such as carboethoxy and hydroxy and lower alkoxy derivatives thereof such as carbo-β-hydroxyethoxy, carbo-β-ethoxyethoxy and carbo-β-(β'-ethoxyethoxy)ethoxy, trifluoromethyl, sulphonamido, N-lower alkyl sulphonamido, N-optionally substituted phenyl sulphonamido, N:N-di(lower alkyl)sulphonamido, carbonamido and N-lower alkyl derivatives thereof, sulphamato ($O.SO_2NH_2$) and N-lower alkyl and N:N-di(lower alkyl)derivatives thereof, phenyl and phthalyl which combines with the phenyl radical to form an anthraquinone radical.

Throughout this specification the terms lower alkyl and lower alkoxy are used to denote alkyl and alkoxy radicals respectively containing from one to four carbon atoms.

The optionally substituted alkyl radicals represented by R, $R^1$, $R^2$, X, Y and Z are preferably optionally substituted lower alkyl radicals; and as examples of such radicals there may be mentioned lower alkyl such as methyl, ethyl, n-propyl and n-butyl, hydroxy lower alkyl such as β-hydroxyethyl, aryl lower alkyl such as benzyl and β-phenylethyl, and lower alkoxy lower alkyl such as β-(methoxy or ethoxy)ethyl and ν-methoxypropyl. The optionally substituted aryl radicals represented by R, $R^1$, $R^2$, X, Y and Z are preferably optionally substituted phenyl radicals; and as examples of such radicals there may be mentioned phenyl itself and tolyl, anisyl, chlorophenyl, bromophenyl and dimethylphenyl.

As examples of the 5- and 6-membered nitrogen containing heterocyclic rings obtained by joining together $R^1$, $R^2$ and the nitrogen atom there may be mentioned piperidino, morpholino and pyrrolidino.

The process of the invention may be conveniently carried out by immersing the synthetic textile material in a dyebath comprising an aqueous dispersion of a monoazo dyestuff as hereinbefore defined, the dispersion being stabilized, if desired, by dispersing agents, for example nonionic dispersing agents, cationic dispersing agents and anionic dispersing agents or a mixture of two or more such dispersing agents. Dyeing is then carried out at the temperature usually employed for the particular textile material. Thus in the case of secondary cellulose acetate textile materials it is preferred to carry out the dyeing process at a temperature between 60° and 85° C.; in the case of cellulose triacetate or polyamide textile material it is preferred to carry out the dyeing process at 95° to 100° C.; in the case of aromatic polyester textile materials the dyeing process can either be carried out at a temperature between 90° and 100° C., preferably in the presence of a carrier such as diphenyl or o-hydroxydiphenyl, or at a temperature above 100° C. preferably at a temperature between 120° and 130° C. under superatmospheric pressure.

Alternatively an aqueous dispersion of the monoazo dyestuff can be padded onto the synthetic textile material, and the dyestuff is fixed on the textile material by steaming it for short periods at temperatures between 100° and 160° C. or by baking it at temperatures between 160° and 220° C. If desired the padding liquor can contain the conventional additives, for example dispersing agents, thickeners, migration inhibitors, or urea.

As a further alternative a thickened printing paste containing the monoazo dyestuff in dispersed form can be applied to the surface of the synthetic textile materials by any of the methods conventionally used for applying printing pastes to synthetic textile materials, for example by block, screen or roller printing. The printed textile material, optionally after being dried, is then steamed for short periods at temperatures between 100° an 160° C., or is baked at temperatures between 160° and 220° C. Suitable thickening agents which are present in the printing paste include gum tragacanth, gum arabic, alginates, or oil-in-water or water-in-oil emulsions. The printing pastes can also contain conventional additives such as urea and sodium m-nitrobenzene sulphonate.

If desired mixtures of the said monoazo dyestuffs can be used, or there can be used mixtures of the said monoazo dyestuffs with other disperse dyestuffs.

At the conclusion of the process of the colored textile material is preferably rinsed in water and/or given a treatment in an aqueous solution of soap or a synthetic detergent before being dried. In the case of aromatic polyester textile materials it is also preferred to subject the colored textile material to a treatment in an alkaline aqueous solution of sodium hydrosulphite before the soaping treatment in order to remove loosely attached dyestuff from the surface of the textile material.

As examples of synthetic textile materials which can be colored by the process of the invention there may be mentioned cellulose acetate and cellulose triacetate textile materials, polyamide textile materials such as polyhexamethyleneadipamide textile materials, and preferably aromatic polyester textile materials such as polyethylene terephthalate textile materials. Such textile materials can be in the form of thread, yarn or woven or knitted fabric. If desired the synthetic textile materials can be in the form of unions with other textile materials, for example polyester/cotton or polyester/wool unions, in which case the dyeing, padding or printing liquor usually contains a suitable dyestuff or dyestuffs such as reactive dyestuffs, for coloring any nonsynthetic textile material present in the union.

By the process of the invention synthetic textile materials can be colored in a wide variety of shades having excellent fastness to the fastness tests commonly applied to the particular textile material, for example to light, to wet treatment and, in the case of synthetic textile materials such as aromatic polyester or cellulose triacetate textile materials, to dry heat treatments. The monoazo dyestuffs, as hereinbefore defined, also have excellent buildup properties on synthetic textile materials so that deep shades can be readily obtained.

The monoazo dyestuffs used in the process of the invention can themselves be obtained by coupling a diazo compound derived from an amine of the formula A—NH₂ with a coupling component of the formula:

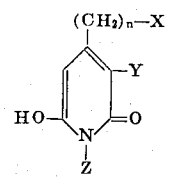

wherein A, n, X, Y and Z have the meanings stated above, the coupling being carried out under aqueous alkaline conditions, the amine and coupling component being free from sulphonic acid and carboxylic acid groups.

As examples of the amines of the formula A—NH₂ there may be mentioned aniline, o-, m- or p-toluidine, o-, m- or p-anisidine, o-, m- or p-chloroaniline, o-, m- or p-bromoaniline, o-, m- or p-nitroaniline, 2:5-dichloroaniline, 2:4-dinitroaniline, 2:4-dinitro-6-(chloro or bromo)aniline, 4-methanesulphonylaniline, 4-aminobenzo-trifuloride, 4- or 5-nitro-2-toluidine, 4- or 5-nitro-2-anisidine, 4- or 5-chloro-2-anisidine, 4- or 6 chloro-2-toluidine, 4- or 5-bromo-2-anisidine, 2:6-di(chloro or brom-)-4-nitroaniline, 2:4:6-trinitroaniline, 2:3 dinitro-6-carbomethoxyaniline, 2-amino-5-nitrobenzotrifluoride, 2:4-bis(methanesulphonyl)aniline, 2-(chloro- or bromo-)-4-nitroaniline, methylanthranilate, 4- or 5-nitromethyl-anthranilate, 4-aminobenzamide, 2:6-di(chloro- or bromo-)aniline-4-sulphonamide, 2:6-di(chloro- or bromo-)-4-methylsulphonylaniline, 2:5-di(chloro- or bromo-)-4:6-dinitro-aniline, 2-amino-3:5-dinitro-benzotrifluoride, 3-amino-2-(chloro- or bromo-)-4:6-dinitro-(toluene or anisole), 3-amino-4-(chloro- or bromo-)-2:6-dinitro-(toluene or anisole), 2- or 4-cyanoaniline, 4-nitro-2-cyanoaniline, 2:4dinitro-6-cyanoaniline, 2-nitro-4-cyanoaniline, 2-chloro-4-cyanoaniline, 3-amino-2:4:6-trinitrotoluene, 2-(chloro- or bromo-)-4-methyl-sulphonylaniline, 3-(chloro- or bromo-)-4-thiocyanatoaniline, 2-(choro- or bromo-)-4-sulphamylaniline, 2-amino-5-nitrophenylmethane-sulphone, 2-amino-3:5-dinitrophenylmethyl-sulphone, 2-amino-3-(chloro- or bromo-)-5-nitrophenyl-methylsulphone, 2-sulphamyl-4-nitroaniline, 2-methyl-sulphamyl-4-nitroaniline, 2-ethylsulphamyl-4-nitroaniline, 2-butyl-sulphamyl-4-nitroaniline, 2-dimethylsulphamyl-4-nitroaniline, 2-methylsulphamyl-4:6-dinitroaniline, 2-methyl-sul-phamyl-4-nitro-6-(chloro- or bromo-)aniline, 2-phenyl-sulphamyl-4-nitroaniline, methyl 2-amino-3-(chloro- or bromo-)-5-nitro-benzoate, dimethyl 2-aminoterephthalate, dimethyl 2-amino-5-nitroterephthalate, aniline -2-, 3- or 4-sulphamate, aniine-2-, 3- or 4-N:N-dimethyl-sulphamate, 4-aminodiphenyl, 1-naphthylamine and 1- or 2-aminoanthraquinone.

The coupling components of the above formula can themselves be obtained by a number of methods, such as are described, for example, in "Heterocyclic Compounds—Pyridine and its derivatives—Part 3" which was edited by Kingsberg and published by Interscience Publishers in 1962. Typical methods include, for example, (1) condensing together compounds of the formula X(CH₂)ₙCOCH₂COOalkyl and Y CH₂COOalkyl in the presence of an excess of an amine of the formula ZNH₂, and (2) cyclization of an α:β-disubstituted glutaconamide of the formula

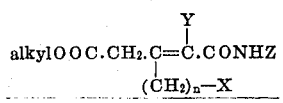

which is itself obtained by condensing together in the presence of a basic catalyst compounds of the formulas X(CH₂)ₙC OCH₂COOalkyl and Y CH₂CONHZ or cyclization of an α:β-di-substituted glutaconamide of the formula:

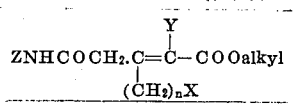

which is itself obtained by condensing compounds of the formulas X(CH₂)ₙCOCH₂CONHZ and Y CH₂COOalkyl.

As specific examples of the said coupling components there may be mentioned 1-(methyl or ethyl)-3-cyano-4-methyl-6-hydroxy-pyrid-2-one, 1-(β-hydroxyethyl or γ-methoxypropyl)-3-cyano-4-methyl-6-hydroxypyrid-2-one, 1-(phenyl, p-tolyl or p-anisyl)-3-cyano-4-(methyl or phenyl)-6-hydroxypyrid-2-one and 1-phenyl-3-(carbonamido or carboethoxy)-4-(methyl or phenyl)-6-hydroxypyrid-2-one.

One preferred class of the monoazo dyestuffs for use in the process of the invention comprises the monoazo dyestuffs wherein A is an optionally substituted phenyl radical.

A second preferred class of the monoazo dyestuffs for use in the process of the invention comprises the monoazo dyestuffs of the formula:

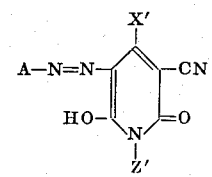

wherein A is an optionally substituted aryl radical, preferably an optionally substituted phenyl radical; X' is a lower alkyl radial and Z' is an optionally substituted lower alkyl or phenyl radical.

Above all are preferred the dyestuffs wherein X' is methyl and Z' is lower alkyl or lower alkoxy lower alkyl in particular ethyl or ν-methoxypropyl.

The invention is illustrated but not limited by the following examples in which the parts and percentages are by weight.

EXAMPLE 1

100 parts of a woven aromatic polyester textile material are immersed in a dyebath comprising a dispersion of 1 part of 1-phenyl-3-cyano-4-methyl-5-phenylazo-6-hydroxypyrid-2-one in 3,000 parts of water containing 1 part of oleyl sodium sulphate. The dyebath is then heated to 130° C. during 30 minutes and maintained at this temperature for a further hour under superatmospheric pressure. The dyed textile material is then removed from the dyebath, rinsed in water, immersed for 15 minutes in an aqueous solution at 50° C. containing 0.2 percent of sodium hydroxide, 0.2 percent of sodium hydrosulphite and 0.1 percent of cetyl trimethylammonium bromide. The textile material is again rinsed in water, then immersed for 15 minutes in a warm dilute aqueous solution of a synthetic detergent, rinsed again in water and finally dried.

The aromatic polyester textile material is thereby dyed a greenish-yellow shade possessing excellent fastness to light, to wet treatments and to dry heat treatments.

The dyestuff used in the above example was obtained by coupling diazotized aniline with 1-phenyl-3-cyano-4-methyl-6-hydroxy-pyrid-2-one in aqueous alkaline medium, acidifying the reaction mixture with acetic acid, and filtering off the precipitated dyestuff. The 1-pheny-3-cyano-4-methyl-6-hydroxypyrid-2-one was itself obtained by condensing acetoacetanilide with ethyl cyanoacetate in the presence of sodium ethoxide.

In pace of the 1 part of the dyestuff used in example 1 there is used 1 part of each of the dyestuffs obtained by diazotizing the amines listed in the second column of the following table and coupling the resulting diazo compounds with the coupling components listed in the third column of the table. The fourth column of the table indicates the shades of the resulting dyed textile material.

| Example | Amine | Coupling Component | Shade |
|---|---|---|---|
| 2 | o-Nitroaniline | 1-phenyl-3-cyano-4-methyl-6-hydroxypyrid-2-one | Greenish-yellow. |
| 3 | o-Chloroaniline | do | Do. |
| 4 | p-Chloroaniline | do | Do. |
| 5 | Ethyl p-aminobenzoate | do | Do. |
| 6 | 3-aminophenyl-N:N-dimethyl-sulphamate | do | Do. |
| 7 | β-ethoxyethyl-p-aminobenzoate | do | Do. |
| 8 | β-hydroxyethyl-p-aminobenzoate | do | Do. |
| 9 | p-Toluidine | do | Reddish-yellow. |
| 10 | p-Anisidine | do | Do. |
| 11 | Aniline | 1-ethyl-3-cyano-4-methyl-6-hydroxypyrid-2-one | Greenish-yellow. |
| 12 | Ethyl p-aminobenzoate | do | Do. |
| 13 | β-ethoxyethyl-p-aminobenzoate | do | Do. |
| 14 | β-hydroxyethyl-p-aminobenzoate | do | Do. |
| 15 | o-Nitroaniline | do | Do. |
| 16 | m-Nitroaniline | do | Do. |
| 17 | p-Nitroaniline | do | Do. |
| 18 | p-Aminobenzenesulphonamide | do | Do. |
| 19 | p-Aminobenzene sulphon-N-ethylamide | do | Do. |
| 20 | 2:4-dichloroaniline | do | Do. |
| 21 | 2:4:5-trichloroaniline | do | Do. |
| 22 | p-Toluidine | do | Reddish-yellow. |
| 23 | p-Anisidine | do | Do. |
| 24 | p-Aminoacetanilide | do | Do. |
| 25 | N-(p-aminophenyl)phthalimide | do | Orange. |
| 26 | Aniline | 1-(γ-methoxypropyl)-3-cyano-4-methyl-6-hydroxypyrid-2-one | Greenish-yellow. |
| 27 | p-Chloroaniline | do | Do. |
| 28 | Ethyl p-aminobenzoate | do | Do. |
| 29 | 3-aminophenyl-N=N-dimethyl-sulphamate | do | Do. |
| 30 | Aniline | 1-(β-hydroxyethyl)-3-cyano-4-methyl-6-hydroxy-pyrid-2-one | Do. |
| 31 | p-Chloroaniline | do | Do. |
| 32 | p-Nitroaniline | do | Do. |
| 33 | Ethyl p-aminobenzoate | do | Do. |
| 34 | p-Aminobenzene sulphonamide | do | Do. |
| 35 | 2:4-dichloroaniline | 1-phenyl-3-cyano-4-methyl-6-hydroxypyrid-2-one | Do. |
| 36 | β-methoxyethyl 4-aminobenzoate | do | Do. |
| 37 | 4-aminobenzene sulphon-N-ethylamide | do | Do. |
| 38 | Aniline | 1-(p-methoxyphenyl)-3-cyano-4-methyl-6-hydroxypyrid-2-one | Do. |
| 39 | 4-chloroaniline | do | Do. |
| 40 | do | 1-(p-N-ethylsulphamoylphenyl)-3-cyano-4-methyl-6-hydroxypyrid-2-one | Do. |
| 41 | Aniline | do | Do. |
| 42 | 2-amino-p-xylene | 1-ethyl-3-cyano-4-methyl-6-hydroxypyrid-2-one | Reddish-yellow. |
| 43 | 4-chloroaniline | do | Greenish-yellow. |
| 44 | 2:5-dichloroaniline | do | Do. |
| 45 | 2:4:6-trichloroaniline | do | Do. |
| 46 | 2-chloro-4-nitroaniline | do | Do. |
| 47 | 2-methoxy-4-nitroaniline | do | Reddish-yellow. |
| 48 | 2-methoxy-5-nitroaniline | do | Do. |
| 49 | 4-methoxy-2-nitroaniline | do | Orange. |
| 50 | β-methoxyethyl 4-aminobenzoate | do | Greenish-yellow. |
| 51 | Dimethyl aminoterephthalate | do | Do. |
| 52 | 3-aminophenyl-N:N-dimethyl sulphamate | do | Do. |
| 53 | 4-aminobenzenesulphon-N-n-propylamide | do | Do. |
| 54 | 4-aminobenzenesulphon-N:N-dimethylamide | do | Do. |
| 55 | 4-aminobenzenesulphon-N:N-di(n-propyl)amide | do | Do. |
| 56 | 4-aminobenzenesulphon-N-phenyl-N-ethylamide | do | Do. |
| 57 | 3-aminobenzenesulphon-N:N-dimethylamide | do | Do. |
| 58 | 4-aminobenzamide | do | Do. |
| 59 | 4-aminobenz-N-ethylamide | do | Do. |
| 60 | 4-aminobenz-N:N-diethylamide | do | Do. |
| 61 | 5-chloro-2-methylaniline | do | Do. |
| 62 | 5-chloro-2-methoxyaniline | do | Reddish-yellow. |
| 63 | 4-methyl-2-nitroaniline | do | Do. |
| 64 | 2-methyl-4-nitroaniline | do | Do. |
| 65 | 4-chloro-2-nitroaniline | do | Do. |
| 66 | 2-methyl-5-nitroaniline | do | Greenish-yellow. |
| 67 | β-Methoxyethyl 3-aminobenzoate | do | Do. |
| 68 | 3-aminobenzene sulphon-N-ethylamide | do | Do. |
| 69 | 3-aminobenzenesulphon-N:N-diethylamide | do | do. |
| 70 | 4-chloro-2-methylaniline | do | Do. |
| 71 | 4-chloro-2-methoxyaniline | do | Reddish-yellow. |
| 72 | β-Methoxyethyl 2-aminobenzoate | do | Greenish-yellow. |
| 73 | β-(β'Methoxyethyl)ethyl 4-aminobenzoate | do | Do. |
| 74 | β-(β'-Ethoxyethyoxy)ethyl 4-aminobenzoate | do | Do. |
| 75 | α:γ-Bis(methoxy)isopropyl 4-aminobenzoate | do | Do. |
| 76 | 4-aminobenzenesulphon-N-ethylamide | 1-(γ-methoxypropyl)-3-cyano-4-methyl-6-hydroxypyrid-2-one | Do. |
| 77 | 2:4-dichloroaniline | do | Do. |
| 78 | 2:4:6-trichloroaniline | do | Do. |
| 79 | 5-chloro-2-methylaniline | do | Do. |
| 80 | 5-chloro-2-methoxyaniline | do | Reddish-yellow. |
| 81 | 2-nitroaniline | do | Greenish-yellow. |
| 82 | 3-nitroaniline | do | Do. |
| 83 | 4-nitroaniline | do | Do. |
| 84 | 4-methyl-2-nitroaniline | do | Reddish-yellow. |
| 85 | 2-methyl-5-nitroaniline | do | Do. |
| 86 | 2-methyl-4-nitroaniline | do | Do. |
| 87 | 4-chloro-2-nitroaniline | do | Yellow. |
| 88 | 2-chloro-4-nitroaniline | do | Do. |
| 89 | β-methoxyethyl 4-aminobenzoate | do | Greenish-yellow. |
| 90 | 4-aminobenzenesulphon-N:N-diethylamide | do | Do. |
| 91 | 3-aminobenzenesulphon-N:N-diethylamide | do | Do. |
| 92 | 3-aminobenzenesulphon-N-ethylamide | do | Do. |
| 93 | 4-chloro-2-methylaniline | do | Yellow. |
| 94 | 4-chloro-2-methoxyaniline | do | Reddish-yellow. |
| 95 | 4-methoxy-2-nitroaniline | do | Orange. |
| 96 | 2-methoxy-5-nitroaniline | do | Yellow. |
| 97 | 2-methoxy-4-nitroaniline | do | Orange. |
| 98 | 2:4:5-trichloroaniline | 1-(β-hydroxyethyl)-3-cyano-4-methyl-6-hydroxypyrid-2-one | Greenish-yellow. |
| 99 | 2-nitroaniline | do | Do. |
| 100 | 3-nitroaniline | do | Do. |
| 101 | β-methoxyethyl 4-aminobenzoate | do | Do. |
| 102 | β-hydroxyethyl 4-aminobenzoate | do | Do. |
| 103 | 4-aminoacetanilide | do | Orange. |
| 104 | 4-aminobenzenesulphon-N-ethylamide | do | Greenish-yellow. |
| 105 | 4-aminobenzamide | do | Do. |
| 106 | 4-aminobenz-N-ethylamide | do | Do. |
| 107 | 4-diethylaminoaniline | 1-ethyl-3-cyano-4-methyl-6-hydroxypyrid-2-one | Violet. |

| Example | Amine | Coupling Component | Shade |
|---|---|---|---|
| 108 | 1-naphthylamine | do | Reddish-yellow. |
| 109 | 2-chloro-1-naphthylamine | do | Do. |
| 110 | 1-aminoanthraquinone | do | Do. |
| 111 | 2-aminoanthraquinone | do | Do. |
| 112 | 4-aminodiphenyl | do | Greenish-yellow. |
| 113 | 4-chloroaniline | 1-benzyl-3-cyano-4-methyl-6-hydroxypyrid-2-one | Do. |
| 114 | 2-nitroaniline | do | Do. |
| 115 | do | 1-(o-tolyl)-3-cyano-4-methyl-6-hydroxypyrid-2-one | Do. |
| 116 | 4-chloroaniline | do | Do. |
| 117 | do | 1-(o-methoxyphenyl)-3-cyano-4-methyl-6-hydroxypyrid-2-one | Do. |
| 118 | 2-nitroaniline | do | Do. |
| 119 | do | 1-(2':4'-dimethylphenyl)-3-cyano-4-methyl-6-hydroxypyrid-2-one | Do. |
| 120 | 4-chloroaniline | do | Do. |
| 121 | 4-methoxy-2-nitroaniline | do | Do. |
| 122 | 2-nitroaniline | 1-(p-chlorphenyl)-3-cyano-4-methyl-6-hydroxypyrid-2-one | Do. |
| 123 | 2-chloroaniline | 1-(naphth-1'-yl)-3-cyano-4-methyl-6-hydroxypyrid-2-one | Do. |
| 124 | 4-chloroaniline | do | Do. |
| 125 | 3-nitroaniline | 1-ethyl-3-carboethoxy-4-methyl-6-hydroxypyrid-2-one | Do. |
| 126 | do | 1-ethyl-3-carbobenzyloxy-4-methyl-6-hydroxypyrid-2-one | Do. |
| 127 | 4-methoxy-2-nitroaniline | do | Orange. |
| 128 | 2:4-dichloroaniline | 1-ethyl-3-carbamoyl-4-methyl-6-hydroxypyrid-2-one | Greenish-yellow. |
| 129 | do | 1-ethyl-3-N:N-diethylcarbamoyl-4-methyl-6-hydroxypyrid-2-one | Do. |
| 130 | 2-chloroaniline | 1-ethyl-3-N-phenylcarbamoyl-4-methyl-6-hydroxypyrid-2-one | Do. |
| 131 | Ethyl-4-aminobenzoate | do | Do. |
| 132 | 2-nitroaniline | do | Do. |
| 133 | 4-methoxy-2-nitroaniline | do | Orange. |
| 134 | 2-methoxy-4-nitroaniline | do | Do. |
| 135 | 3-nitroaniline | do | Greenish-yellow. |
| 137 | 2-nitroaniline | do | Do. |
| 138 | 4-chloroaniline | 1-ethyl-3-acetyl-4-methyl-6-hydroxypyrid-2-one | Do. |
| 139 | 4-diethylaminoaniline | do | Violet. |
| 140 | 4-diethylamino-2-methylaniline | do | Bluish-violet. |
| 141 | 4-chloroaniline | 1-ethyl-3-cyano-4-ethoxycarbonylmethyl-6-hydroxypyrid-2-one | Greenish-yellow. |
| 142 | do | 1-ethyl-3-cyano-4-carboethoxy-6-hydroxypyrid-2-one | Do. |
| 143 | 2-nitroaniline | do | Do. |
| 144 | Ethyl-4-aminobenzoate | do | Do. |
| 145 | 4-methoxy-2-nitroaniline | 1-ethyl-3-cyano-4-carbamoyl-6-hydroxypyrid-2-one | Orange. |
| 146 | 3-nitroaniline | 1-ethyl-3-cyano-4-N-ethylcarbamoyl-6-hydroxypyrid-2-one | Greenish-yellow. |
| 147 | do | 1-ethyl-3-cyano-4-N-phenylcarbamoyl-6-hydroxypyrid-2-one | Do. |
| 148 | 4-chloroaniline | do | Do. |
| 149 | 2-methoxyaniline | do | Reddish-yellow. |
| 150 | 2-methoxy-4-nitroaniline | do | Orange. |
| 151 | 4-methoxy-2-nitroaniline | do | Do. |
| 152 | do | 1-ethyl-3-cyano-4-phenyl-6-hydroxypyrid-2-one | Do. |
| 153 | do | 1-ethyl-3-cyano-4-(p-methoxyphenyl)-6-hydroxypyrid-2-one | Do. |
| 154 | do | 1-ethyl-3-cyano-4-(p-chlorophenyl)-6-hydroxypyrid-2-one | Do. |
| 155 | do | 1-ethyl-3-cyano-4-(N-ethylcarbamoylmethyl)-6-hydroxypyrid-2-one | Do |
| 156 | 4-chloroaniline | 1-ethyl-4-N-ethylcarbamoyl-6-hydroxypyrid-2-one | Greenish-yellow. |
| 157 | do | 1-ethyl-4-carboethoxy-6-hydroxypyrid-2-one | Do. |
| 158 | do | 1-ethyl-6-hydroxypyrid-2-one | Do. |
| 159 | do | 1-ethyl-3:4-dimethyl-6-hydroxypyrid-2-one | Do. |
| 160 | do | 1-ethyl-4-methyl-6-hydroxypyrid-2-one | Do. |
| 161 | 2:4-dinitro-6-bromoaniline | 1-ethyl-3-cyano-4-methyl-6-hydroxypyrid-2-one | Yellow. |
| 162 | 2-cyano-4-nitroaniline | do | Do. |
| 163 | 4-methylsulphonylaniline | do | Do. |
| 164 | 2-trifluoromethylaniline | do | Do. |
| 165 | 4-acetylaniline | do | Do. |
| 166 | 2-nitroaniline | 1-ethyl-3-cyano-4-cyanomethyl-6-hydroxypyrid-2-one | Do. |
| 167 | 4-chloroaniline | do | Do. |
| 168 | do | 1-ethyl-3-cyano-4-acetylmethyl-6-hydroxypyrid-2-one | Do. |
| 169 | 2-nitroaniline | do | Do. |
| 170 | do | 1-ethyl-3:4-dimethyl-6-hydroxypyrid-2-one | Do. |
| 171 | 2-nitro-4-methoxyaniline | do | Orange. |
| 172 | 3-nitroaniline | 1-ethyl-3-phenyl-4-methyl-6-hydroxypyrid-2-one | Greenish-yellow. |
| 173 | 2:4-dinitroaniline | do | Yellow. |
| 174 | Aniline | 1-ethyl-3-(p-chlorphenyl)-4-methyl-6-hydroxypyrid-2-one | Do. |
| 175 | 4-chloraniline | do | Do. |
| 176 | 4-methyl-3-nitroaniline | 1-ethyl-3:4-dimethyl-6-hydroxypyrid-2-one | Greenish-yellow. |
| 177 | 2-bromo-4-nitroaniline | do | Do. |
| 178 | 2-cyano-4-nitroaniline | do | Do. |
| 179 | 4-acetylaniline | do | Do. |
| 180 | 4-methylsulphonylaniline | do | Do. |
| 181 | Ethyl 4-aminobenzoate | do | Do. |
| 182 | 2-trifluoromethylaniline | do | Do. |
| 183 | 4-acetylamino-aniline | do | Orange. |
| 184 | 4-aminobenzamide | do | Greenish-yellow. |
| 185 | 4-aminobenzene sulphonamide | do | Do. |
| 186 | 4-aminobenzene sulphon-N:N-diethylamide | do | Do. |
| 187 | 1-naphthylamine | do | Reddish-yellow. |
| 188 | 1-aminoanthraquinone | do | Do. |
| 189 | 4-aminodiphenyl | do | Yellow. |
| 190 | 4-aminobenzanilide | do | Greenish-yellow. |
| 191 | 4-chloraniline | 1-(γ-methoxypropyl)-3:4-dimethyl-6-hydroxypyrid-2-one | Do. |
| 192 | 3-nitroaniline | 1-phenyl-3:4-dimethyl-6-hydroxypyrid-2-one | Do. |
| 193 | 2:4-dichloroaniline | 1-(p-methoxyphenyl)-3:4-dimethyl-6-hydroxypyrid-2-one | Do. |
| 194 | Ethyl 4-aminobenzoate | 1-(m-chlorophenyl)-3:4-dimethyl-6-hydroxypyrid-2-one | Do. |
| 195 | β-Methoxyethyl 4-aminobenzoate | 1-(2':4'-dimethylphenyl)-3:4-dimethyl-6-hydroxypyrid-2-one | Do. |
| 196 | 4-chloraniline | 1-ethyl-4-benzyl-6-hydroxypyrid-2-one | Do. |
| 197 | do | 1-ethyl-4-(p-methoxybenzyl)-6-hydroxypyrid-2-one | Do. |
| 198 | do | 1-ethyl-3:4-diphenyl-6-hydroxypyrid-2-one | Do. |
| 199 | 4-methoxy-2-nitroaniline | do | Reddish-yellow. |

The 1-ethyl-3-cyano-4-methyl-6-hydroxypyrid-2-one used in the above examples was obtained by condensing together ethyl acetoacetate, ethyl cyanoacetate and ethylamine.

The 1-(γ-methoxypropyl)-3-cyano-4-methyl-6-hydroxypyrid-2-one used in the above examples was obtained by condensing together ethyl acetoacetate, ethyl cyanoacetate and γ-methoxypropylamine.

The 1-(β-hydroxyethyl)-3-cyano-4-methyl-6-hydroxypyrid-2-one used in the above examples was obtained by condensing together ethyl acetoacetate, ethyl cyanoacetate and β-hydroxyethylamine.

The 1-(o-methoxyphenyl)-3-cyano-4-methyl-6-hydroxypyrid-1-one, 1-(p-methoxyphenyl)-3-cyano-4-methyl-6-hydroxypyrid-1-one, 1-(o-tolyl)-3-cyano-4-methyl-6-hydroxypyrid-2-one, 1-(p-N-ethyl-sulphamoylphenyl)-3-cyano-4-methyl-6-hydroxypyrid-2-one, 1-(2':4'-dimethylphenyl)-3-cyano-4-methyl-6-hydroxypyrid-2-one, 1-(p-chloro-phenyl)-3-cyano-4-methyl-6-hydroxypyrid-2-one used in the above examples were obtained by condensing the appropriately substituted acetoacetanilide with ethyl cyanoacetate in the presence of sodium ethoxide.

The 1-benzyl-3-cyano-4-methyl-6-hydroxypyrid-2-one was obtained by condensing together ethyl acetoacetate, ethyl cyanoacetate and benzylamine.

1-(Naphth-1'-yl)-3-cyano-4-methyl-6-hydroxypyrid-2-one was obtained by condensing acetoacet-1-naphthylamide with ethylcyano-acetate in the presence of sodium ethoxide.

1-Ethyl-3-carboethoxy-4-methyl-6-hydroxy-pyrid-2-one was obtained by condensing acetoacetethylamide with diethylmalonate in the presence of sodium ethoxide. This product on transesterification with benzyl alcohol gives 1-ethyl-3-carbobenzyloxy-4-methyl-6-hydroxy-pyrid-2-one.

1-Ethyl-3-[carbamoyl, N:N-diethylcarbamoyl, N-phenylcarbamoyl or piperidin-1'-ylcarbamoyl]-4-methyl-6-hydroxypyrid-2-one were obtained by treating 1-ethyl-3-carboethoxy-4-methyl-6-hydroxypyrid-2-one with ammonia, diethylamine, aniline and piperidine respectively.

1-Ethyl-3-acetyl-4-methyl-6-hydroxypyrid-2-one was obtained by reacting 1-ethyl-4-methyl-6-hydroxypyrid-2-one with acetyl chloride in the presence of aluminum chloride.

1-Ethyl-3-cyano-4-ethoxycarbonylmethyl-6-hydroxypyrid-2-one was obtained by condensing ethyl acetone dicarboxylate with cyanoacetethylamide in the presence of sodium ethoxide.

1-Ethyl-3-cyano-4-carboethoxy-6-hydroxypyrid-2-one was obtained by condensing the diethyl ester of oxaoacetic acid with cyanoacetethylamide in the presence of sodium ethoxide. This product on treatment with ammonia, ethylamine or aniline gave the corresponding 4-carbamoyl derivatives.

1-Ethyl-3-cyano-4-(phenyl, p-methoxyphenyl and p-chlorophenyl)-6-hydroxypyrid-2-one were obtained by condensing together ethylbenzoylacetate or the p-methoxy or p-chloro derivatives thereof, ethyl cyanoacetate and ethylamine.

1-Ethyl-3-cyano-4-(N-ethylcarbamoylmethyl)-6-hydroxypyrid-2-one was obtained by reacting 1-ethyl-3-cyano-4-ethoxycarbonylmethyl-6-hydroxypyrid-2-one with ethylamine.

1-Ethyl-4-N-ethylcarbamoyl-6-hydroxypyrid-2-one was obtained by heating a mixture of citric acid and ethylamine under pressure. This compound on hydrolysis and subsequent esterification gave 1-ethyl-4-carboethoxy-6-hyroxypyrid-2-one.

1-Ethyl-6-hydroxypyrid-2-one was obtained by reaction of ethylglutaconate with ethylamine.

1-Ethyl-3:4-dimethyl-6-hydroxypyrid-2-one was obtained by reaction of ethyl-α:β-dimethylglutaconate with ethylamine.

1-Ethyl-4-methyl-6-hydroxypyrid-2-one was obtained by reaction of ethyl-β-methylglutaconate with ethylamine.

1-Ethyl-3-(phenyl and p-chorophenyl)-4-methyl-6-hydroxypyrid-2-one were obtained by reacting ethyl α-(phenyl and p-chloro-phenyl)-β-methylglutaconate respectively with ethylamine.

1-Ethyl-3-cyano-4-cyanomethyl-6-hydroxypyrid-2-one was obtained by condensing together ethyl cyanoacetoacetate, ethyl cyanoacetate and ethylamine.

1-Ethyl-3-cyano-4-acetylmethyl-6-hydroxypyrid-2-one was obtained by condensing together ethyl 3:5-dioxohexanoate, ethyl cyanoacetate and ethylamine.

1-(γ-Methoxypropyl, phenyl, p-methoxyphenyl, m-chlorophenyl and 2':4'-dimethylphenyl)-3:4-dimethyl-6-hydroxypyrid-2-one were obtained by reacting diethyl α:β-dimethylglutaconate with γ-methoxy-propylamine, aniline, p-anisidine, m-chloroaniline and 2:4-dimethyl-aniline respectively.

1-Ethyl-4-(benzyl and p-methoxy benzyl)-6-hydroxypyrid-2-one were obtained by reacting ethylamine with diethyl-β-(benzyl and p-methoxybenzyl)glutaconate respectively.

EXAMPLE 200

100 parts of a woven aromatic polyester material are immersed in a dyebath comprising a dispersion of 1 part of 1-(γ-methoxypropyl)-3-cyano-4-methyl-5-(m-sulphon-N:N-diethylamidophenylazo)-6-hydroxy-pyrid-2-one and a dispersion of 6 parts of o-phenylphenol in 3,000 parts of water containing 3 parts of the disodium salt of a dinaphthyl-methane disulphonic acid, and dyeing is then carried out for 90 minutes at 100° C. The dyed textile material is then removed from the dyebath and after treated as described in Example 1.

The aromatic polyester textile material is dyed a greenish-yellow shade of excellent fastness properties.

EXAMPLE 201

A print paste is prepared comprising:

| | |
|---|---|
| 1-Ethyl-3-cyano-4-methyl-5-[p-(carbo-β-methoxyethoxy)phenylazo]-6-hydroxypyrid-2-one | 10 parts |
| Gum Tragacanth | 200 parts |
| Water | 790 parts |
| | 1000 parts | and is then printed onto a woven cellulose triacetate textile material by screen printing. The printed material is dried at 60° C. and is then steamed for 30 minutes using saturated steam at atmospheric pressure. The printed textile material is then treated for 5 minutes in a 0.2 percent aqueous solution of a synthetic detergent at 50° C., rinsed in water and dried.

A bright greenish-yellow print is thereby obtained which possesses excellent fastness to light and to wet treatments.

A woven secondary cellulose acetate textile material can also be printed with the print paste using the above method.

The above print paste can also be printed onto a woven aromatic polyester textile material, and the material, after being dried, is subjected for 30 minutes to saturated steam at 120° C. A greenish-yellow print of excellent fastness properties is thereby obtained.

EXAMPLE 202

100 parts of secondary cellulose acetate in the form of yarn are immersed in a dyebath comprising a dispersion of 1 part of 1-ethyl-3-cyano-4-methyl-5-[p-(carbo-β-methoxyethoxy)phenylazo]-6-hydroxypyrid-2-one in 3,000 parts of water containing 3 parts of a condensate of 22 mole of ethylene oxide with 1 mol of cetyl/alcohol, and dyeing is then carried out for 1 hour at 85° C. The dyed yarn is then removed from the dyebath, rinsed in cold water and dried.

The yarn is thereby colored a greenish-yellow shade possessing good fastness to light and to washing.

EXAMPLE 203

A woven aromatic polyester textile material is padded through a liquor comprising 20 parts of 1-ethyl-3-cyano-4-methyl-5-(m-sulphon-N-ethylamidophenylazo)-6-hydroxypyrid-2-one dispersed in 1,000 parts of water containing 2 parts of a condensate of 9 mols of ethylene oxide with 1 mol of nonylphenol, and the textile material is then squeezed between rollers so that it only retains is own weight of the said liquor. The textile material is dried at 60° C., and is then baked for 1 minute at 200° C. The textile material is then rinsed in water, treated for 10 minutes in a 0.2 percent aqueous solution of a synthetic detergent at 70° C., rinsed again in water and finally dried.

The textile material is thereby colored a bright yellow shade of excellent fastness properties.

EXAMPLE 204

100 parts of cellulose triacetate yarn are immersed in a dyebath comprising a dispersion of 1 part of 1-ethyl-3-cyano-4-methyl-5-(m-N:N-dimethylsulphamatophenylazo)-6-hydroxypyrid-2-one in 3,000 parts of water containing 6 parts of diethyl phthalate and 3 parts of the sodium salt of a sulphated mixture of cetyl and oleyl alcohols, and dyeing is then carried out for 90 minutes at 100° C. The yarn is then removed from the dyebath, rinsed in water, treated for 30 minutes in a 0.2 percent aqueous solution of a synthetic detergent at 0° C., rinsed again in water, and is finally dried. The yarn is thereby dyed a bright greenish-yellow shade of excellent fastness to light and to wet treatments.

Polyhexamethylene adipamide in the form of yarn is dyed by the same method except that the diethylphthalate is omitted from the dyebath and dyeing is carried out at 95° C. instead of 100° C. A bright greenish-yellow dyeing of excellent fastness properties is obtained.

We claim:

1. Process for coloring synthetic textile materials selected from the class consisting of cellulose acetate, polyamide and aromatic polyester textile materials, which comprises applying to said textile materials, by a dyeing, padding and printing process, an aqueous dispersion of a monoazo dyestuff free from sulphonic acid and carboxylic acid groups and which, in one of the possible tautomeric forms, is represented by the formula:

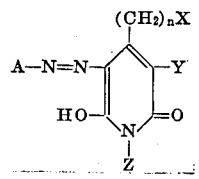

wherein A is aryl or substituted aryl; $n$ is 0 or 1; Z is lower alkyl, phenyl, substituted lower alkyl or substituted phenyl; and X and Y each independently represent hydrogen, lower alkyl, phenyl, substituted lower alkyl or substituted phenyl, or a —CN, —COOR, —COR or —CONR$^1$R$^2$ radical, wherein R is lower alkyl, phenyl, substituted lower alkyl or substituted phenyl and R$^1$ and R$^2$ each independently represent hydrogen, lower alkyl, phenyl, substituted lower alkyl, substituted phenyl or R$^1$ and R$^2$ together form with the nitrogen atom N a 6-membered nitrogen containing heterocyclic ring.

2. Process as claimed in claim 1 wherein the dyestuff is of the formula:

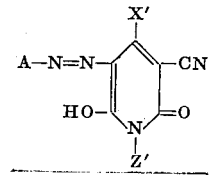

wherein A' is phenyl or substituted phenyl, X' is lower alkyl and Z' is lower alkyl or lower alkoxy lower alkyl.

3. Process as claimed in claim 1 wherein the textile material is a polyethylene terephthalate textile material.

4. Process as claimed in claim 1 wherein the textile is selected from the group consisting of secondary cellulose acetate, cellulose triacetate, polyhexamethylene adipamide and polyethylene terephthalate.

* * * * *